Jan. 9, 1951     E. F. ROSSMAN     2,537,425

SHOCK ABSORBER

Filed Aug. 15, 1947

INVENTOR.
EDWIN F. ROSSMAN
BY
Spencer, Hardman &c.
HIS ATTORNEYS

Patented Jan. 9, 1951

2,537,425

UNITED STATES PATENT OFFICE 2,537,425

SHOCK ABSORBER

Edwin F. Rossman, Dayton, Ohio, assignor to General Motors Corporation, Detroit, Mich., a corporation of Delaware Application August 15, 1947, Serial No. 768,766

2 Claims. (Cl. 188—88)

1

This invention relates to improvements in hydraulic shock absorbers particularly of the direct acting type.

It is among the objects of the present invention to simplify the design and construction of the direct acting shock absorber by eliminating some parts and using other parts to perform not only their own function but also the functions of parts eliminated.

In the present invention this object is accomplished by providing integral elements struck from the cylinder of the shock absorber, these elements providing openings in the cylinder for the return of fluid leakage to the reservoir and also provide means for locking the cylinder head against movement in the cylinder and abutments upon which the pressure spring of the packing in the shock absorber is seated.

Further objects and advantages of the present invention will be apparent from the following description, reference being had to the accompanying drawings wherein a preferred embodiment of the present invention is clearly shown.

Figure 1:
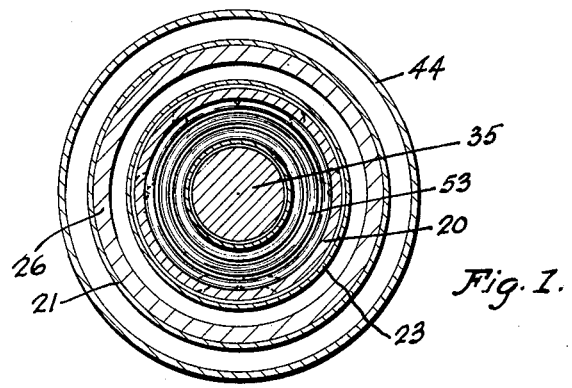
Fig. 1 is a transverse section of the shock absorber taken along the line 1—1 of Fig. 2.
Figure 3:
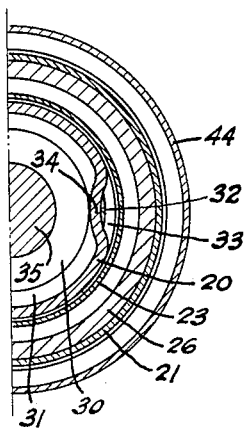
Fig. 3 is a transverse, half sectional view taken along the line 3—3 of Fig. 2.

Referring to the drawings, the working cylinder is designated by numeral 20. Surrounding this cylinder 20 is a larger diameter tube 21 which forms the annular chamber 22 around the cylinder, said chamber forming the fluid containing reservoir of the shock absorber. Another tube 23 surrounds the cylinder 20, this tube being considerably smaller in diameter than the reservoir tube 21. This tube 23 forms a narrow annular space 24 around the cylinder 20. An inwardly extending annular flange 25 is provided at one end of tube 23 said flange resting upon the one or upper end of the cylinder 20. A cover cap 26 fits into and is secured to the tube 21, this cover cap engaging the flange 25 of tube 23 to press it against the end of the cylinder and the cylinder in turn upon the closure member 27 at the opposite end of the shock absorber. One end of tube 21 is secured to the closure member 27 in any suitable manner preferably by welding.

A centrally apertured plug 30 is press fitted into the cylinder 20, this plug having an annular recess 31 provided in its outer end surface. A plurality of end to end grooves 32 are provided in

2 the outer peripheral surface of the plug 30 and cooperate with the inner wall of the cylinder 20 to form passages connecting the space on both sides of plug 30.

Figure 2:
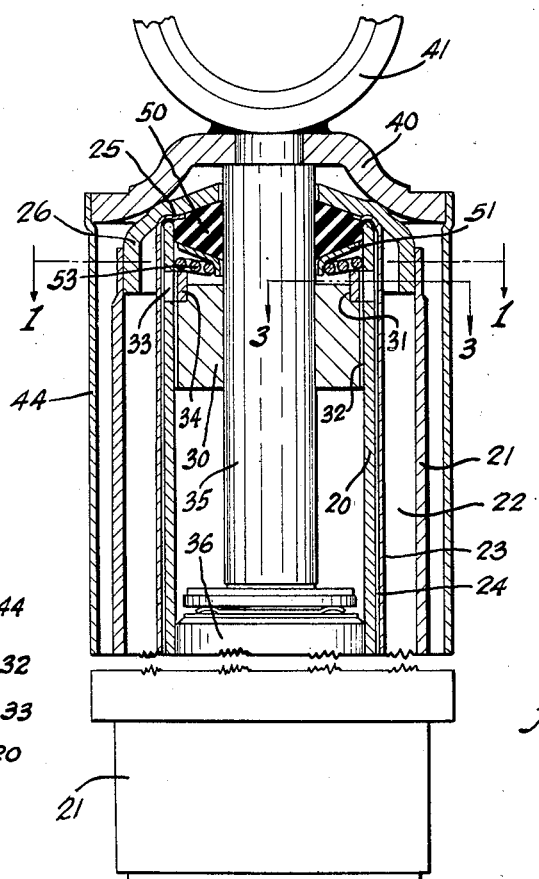
Fig. 2 is a fragmentary longitudinal sectional view of a shock absorber constructed according to the present invention.

Adjacent the end of the cylinder engaged by the flange 25 of tube 23, the cylinder wall has annularly aligned openings 33 formed by portions of the cylinder wall designated by the numeral 34, struck from the cylinder wall and bent inwardly into the cylinder so as to seat in the annular groove 31 in the plug 30. As clearly shown in Fig. 2 these integral inwardly extending portions 34 of the cylinder provide abutments which are engaged by the plug 30 and prevent movement of the plug 30 outwardly in the cylinder. The plug 30 is centrally apertured to provide a bearing for the piston rod 35 which slidably extends through said plug and through a central opening in the cover cap 26. Within the cylinder this rod 35 has a piston 36 attached thereto, said piston forming working chambers on either side thereof within the cylinder. Rod 35, extending beyond the confines of the cover cap 26, has a disc 40 and a mounting ring 41 attached thereto in any suitable manner. Ring 41 provides means for attaching this portion of the shock absorber to one of the relatively movable members whose movements are to be controlled by the shock absorber, while a similar ring 42, secured to the closure member 27, provides means for attaching the other elements of the shock absorber to the other member whose movement is to be controlled. Disc 40 has one end of a tube 44 secured thereto, said tube extending over and surrounding a portion of the tube 21 and acting as a stone guard therefor protecting tube 21 against damage during use of the shock absorber on vehicles.

The chamber between plug 30 and the cover cap 26 is in communication with the fluid reservoir through the openings 33 in the cylinder and the annular space 24 between the cylinder and the tube 23. This annular space communicates with the reservoir inasmuch as tube 23 extends downwardly into the reservoir a sufficient distance so that the end of tube 23 is constantly below the normal level of the fluid within the reservoir. Within the chamber between plug 30 and cover cap 26 there is provided a packing gland 50 of any suitable resilient material such as rubber or the like. This packing gland snugly fits about the piston rod 35 and engages the inner surfaces of the cover cap 26 and cylinder portion forming this chamber. An abutment ring 51 engages one surface of the packing gland 50, said abutment ring 51 being engaged by one end of the coil spring 53, the other end of said spring seating upon the inwardly extending integral portions 34 of the cylinder.

From the aforegoing it may be seen that these inwardly extending integral portions 34 struck from the cylinder wall perform three functions: first, in striking these portions 34 from the cylinder wall there are provided openings 33 which connect the chamber containing the packing 50 with the fluid reservoir 22 whereby any fluid leaking past the bearing between the piston rod 35 and plug 30 or leaking through the end to end passages 32 may be returned to the fluid reservoir. Portions 34 of the cylinder 20 also act as abutments in one instance for the plug 30 to prevent its movement outwardly in the cylinder and also as abutments for one end of the coil spring 53 which constantly exerts a pressure upon the packing gland 50 to urge said gland in sealing engagement with the piston rod 35 and the inner surfaces of the cover cap 26 and cylinder portion about this chamber.

Grooves 32 also permit the ejection of air within the working chamber of the cylinder through said grooves 32 to the chamber between plug 30 and cover cap 26, the air then passing through openings 33, the annular passage 24 into the fluid within the reservoir where it will rise and be trapped in the space above the fluid within the reservoir.

While the embodiment of the present invention as herein disclosed, constitutes a preferred form, it is to be understood that other forms might be adopted, all coming within the scope of the claims which follow.

What is claimed is as follows:

1. A hydraulic shock absorber comprising a cylinder; a fluid reservoir; a cover cap for the cylinder and reservoir; a plug in the cylinder; a piston in the cylinder, said piston having a rod extending through the plug and cap; a packing in the cap, surrounding the piston rod; a spring urging the packing into sealing engagement with the cylinder, cap and piston rod; and means comprising inwardly extending webs struck from the cylinder and integral therewith, the lower edges of said webs providing abutments for locking the plug against movement in the cylinder, the upper edges of said webs providing abutments for the spring, the forming of said webs providing openings in the cylinder wall for draining the space occupied by the packing.

2. A hydraulic shock absorber comprising in combination, two concentric tubular members, one forming a working cylinder, the other a fluid reservoir; a cap fitting about the reservoir tube and covering the end of the cylinder; a piston in the cylinder having a rod extending through an opening in the cap; a rod guide in the cylinder; a packing in the cap engaging the rod and interior surfaces of the cap and adjacent cylinder portion; inwardly extending webs struck from the cylinder wall to form openings in the cylinder for connecting the space between the packing and rod guide with the reservoir; said webs providing abutments engaged by the rod guide, and a spring interposed between said webs and the packing.

EDWIN F. ROSSMAN.

REFERENCES CITED

The following references are of record in the file of this patent:

UNITED STATES PATENTS

| Number | Name | Date |
| --- | --- | --- |
| 2,214,038 | Beecher | Sept. 10, 1940 |
| 2,276,406 | Magrum | Mar. 17, 1942 |
| 2,401,379 | Smith | June 4, 1946 |

FOREIGN PATENTS

| Number | Country | Date |
| --- | --- | --- |
| 101,401 | Australia | June 21, 1937 |